US009039526B2

(12) United States Patent
Hilbert

(10) Patent No.: US 9,039,526 B2
(45) Date of Patent: May 26, 2015

(54) GAMING MACHINE HAVING TRANSPARENT DISPLAY

(71) Applicant: BALLY GAMING, INC., Las Vegas, NV (US)

(72) Inventor: Scott Hilbert, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/256,080

(22) Filed: Apr. 18, 2014

(65) Prior Publication Data

US 2014/0315637 A1 Oct. 23, 2014

Related U.S. Application Data

(60) Provisional application No. 61/814,982, filed on Apr. 23, 2013.

(51) Int. Cl.
*A63F 13/00* (2014.01)
*G07F 17/32* (2006.01)

(52) U.S. Cl.
CPC .................................. *G07F 17/3211* (2013.01)

(58) Field of Classification Search
CPC ................ A63F 13/06; A63F 2300/10; A63F 2300/1068; A63F 2300/30; A63F 2300/308
USPC .................................... 463/16, 31, 33, 37, 46
See application file for complete search history.

(56) References Cited

U.S. PATENT DOCUMENTS 4,621,814 A * 11/1986 Stepan et al. .................. 463/46
2004/0137978 A1* 7/2004 Cole et al. ...................... 463/16
2009/0325668 A1* 12/2009 Kelly et al. .................... 463/20
2011/0164047 A1* 7/2011 Pance ............................ 345/581
2012/0083909 A1* 4/2012 Carpenter et al. ............. 700/92
2012/0256854 A1* 10/2012 Lee et al. ...................... 345/173
2013/0116028 A1* 5/2013 Aoki et al. ..................... 463/16

* cited by examiner

*Primary Examiner* — James S McClellan
(74) *Attorney, Agent, or Firm* — Philip J. Anderson; Marvin A. Hein

(57) ABSTRACT

Disclosed are various embodiments of transparent displays for gaming machines and, more particularly, to placement of a single transparent or partially transparent display between two facing gaming machines for common play of a shared gaming machine feature.

11 Claims, 12 Drawing Sheets

GAMING MACHINE HAVING TRANSPARENT DISPLAY

CROSS REFERENCE TO RELATED APPLICATIONS

This application is a non-provisional application claiming benefit of the filing date of U.S. Provisional Patent Application Ser. No. 61/814,982 filed Apr. 23, 2013 and titled "Gaming Machine Having Transparent Display".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The invention generally relates to gaming machines and, more particularly, to placement of a shared video display between two facing players for common play of a shared game feature.

2. The Prior Art

Playing gaming machines is an enjoyable pastime for many people. Gaming machines include machines that are typically operated by a user by inserting coins, tokens, credit cards, smart cards, tickets or coupons with monetary value. The machines may include, e.g., slot machines, pinball machines, video games and computer stations for playing games alone or with other users, such as bingo, card games and the like. The machines may operate based on both luck and the user's skill. Such gaming machines may be located in casinos, video arcades, gas stations, bars or any other location. The gaming machines may be used for gambling, where the user receives a monetary or other prize when the machine pays off, or simply for amusement.

In today's video based gaming machines, display placement and viewing limits the gaming machine to a single user platform. Side-by-side game platforms have been deployed but have limitations and provide a shared user experience rather than an individual gaming experience.

Accordingly, there is a need for, and the present invention provides a system to overcome the above limitations.

SUMMARY OF THE INVENTION

This invention applies new transparent display technology to wagering machines. Using a transparent OLED, e-ink or other emissive display technology allows the placement of a single display between two players, facing each other for example. In accordance with one or more embodiments, this display may be a display disposed between two players and is used to play a head to head competitive bonus. The bonus game could alternatively be a cooperative game where both players work toward a common goal. One advantage of such a gaming platform is that players can see each other which will enhance the game play through player emotion.

In accordance with one or more embodiments, the transparent display may be the main game display with a player always seeing the opponent.

Yet other embodiments use the transparent display as a shared outcome display between two head to head players and use a lower individual display to allow each player to make selections or game actions without the opponent knowing their choices in game such as Texas Hold-em poker or Battleship, for example. For Battleship, the outcome of each player's action could be displayed with video animation on the shared transparent display (a Hit or Miss of the opponent's ship).

In accordance with one or more embodiments, the transparent display may include a mechanism such as an electronic shutter to make the display opaque during single player use and then transparent during head to head play.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
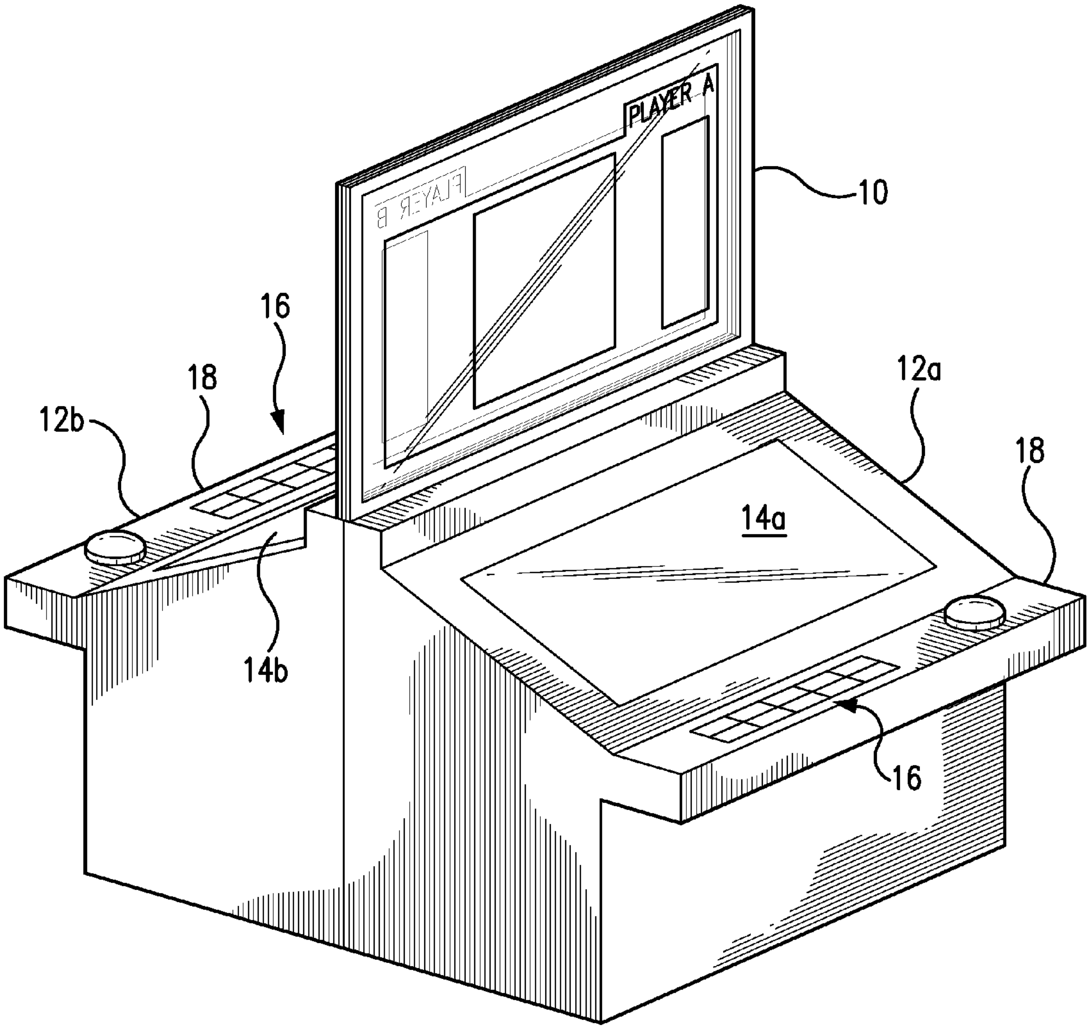
FIG. 1 illustrates an example of a transparent shared gaming display in accordance with one or more embodiments.
Figure 2:
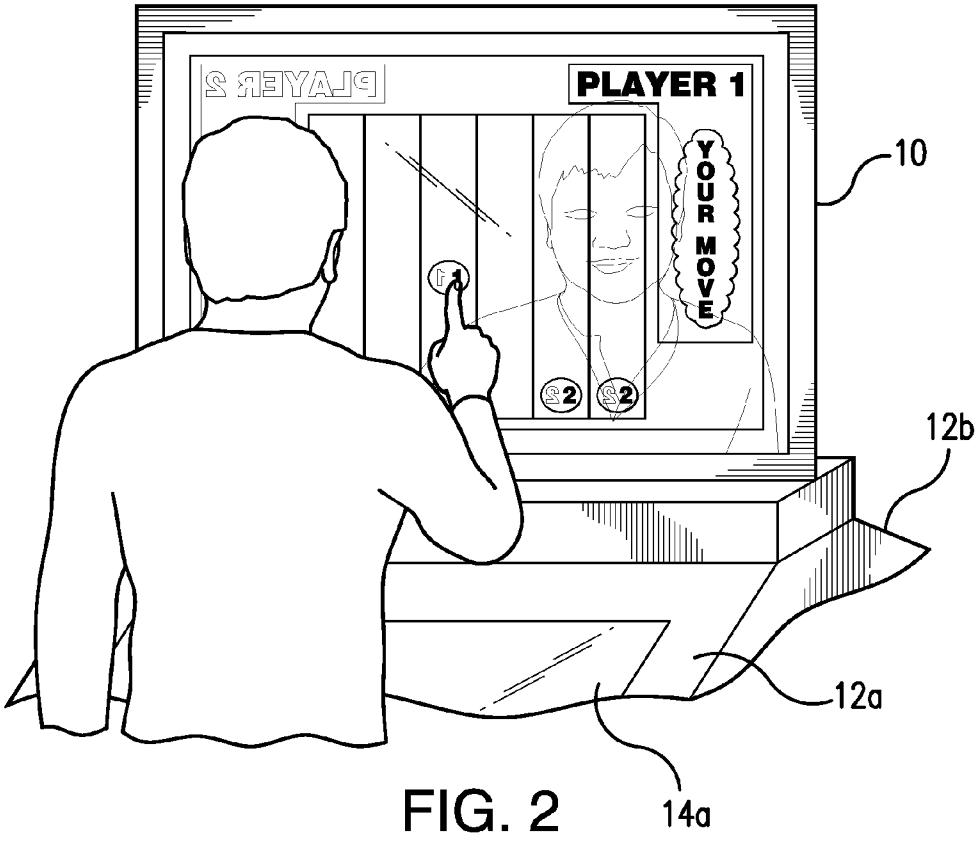
FIG. 2 illustrates an example of two players playing face-to-face in accordance with one or more embodiments.

In accordance with one or more embodiments, transparent OLED, e-ink or other emissive display technology allows the placement of a single, shared, display between two players facing each other, as in FIGS. 1 and 2 illustrate embodiments including an upper, transparent, shared feature display 10 disposed to be shared by back-to back arranged gaming terminals 12*a*, 12*b* each terminal configured to present a base game to each of two players. In accordance with one or more embodiments, the transparent shared display 10 is a shared outcome display between two head to head players with a lower individual terminal display 14*a*, 14*b* on each of their gaming terminals 12*a*, 12*b* used to allow each player to make selections or game actions without the opponent seeing some of their information (cards, game pieces, etc.) and their choices related to this information.

Figure 3:
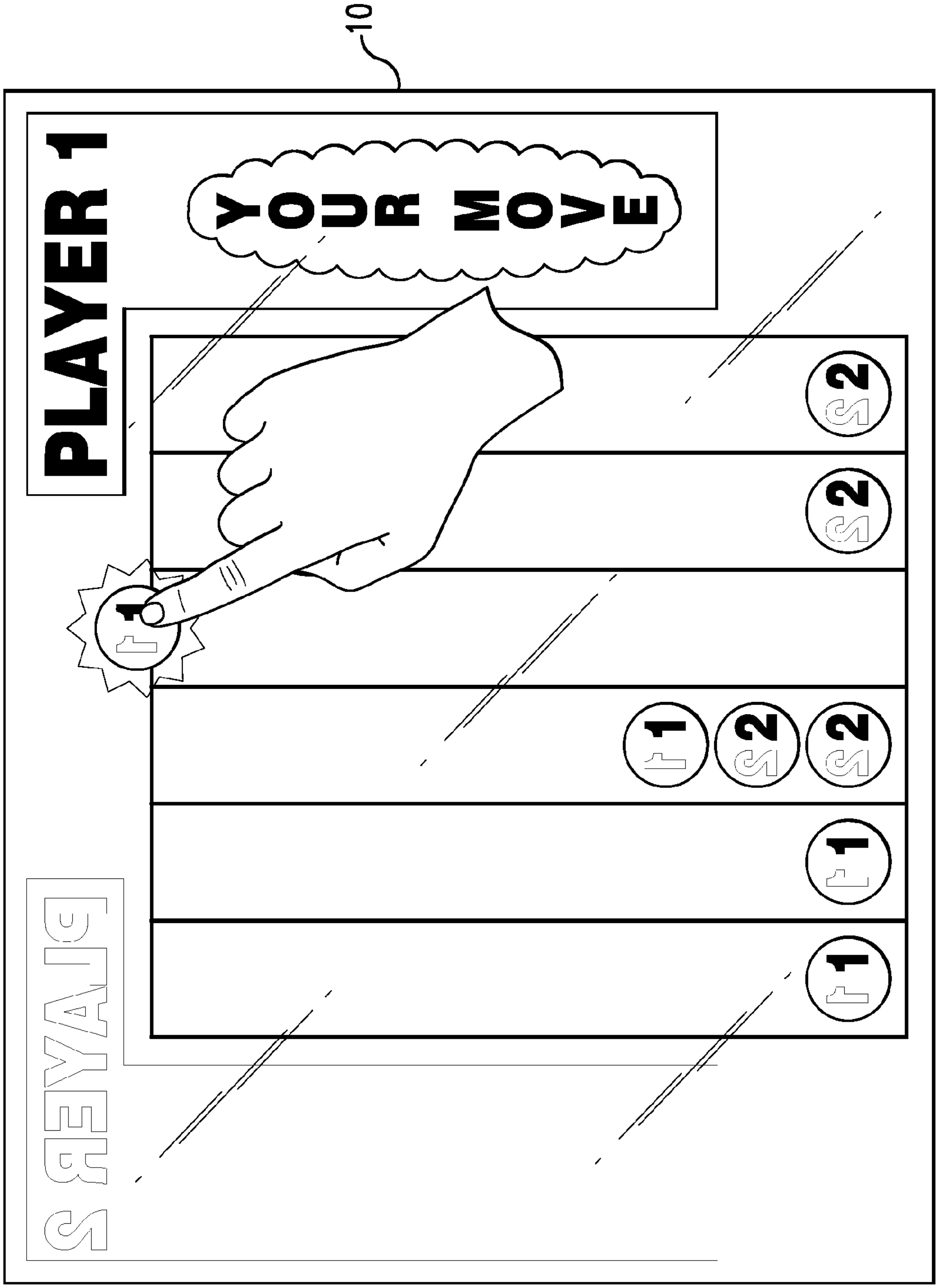
FIGS. 3 and 4 illustrate possible game displays in which some aspects of the display are common while other aspects of the display are individual to each player in accordance with one or more embodiments.
Figure 4:
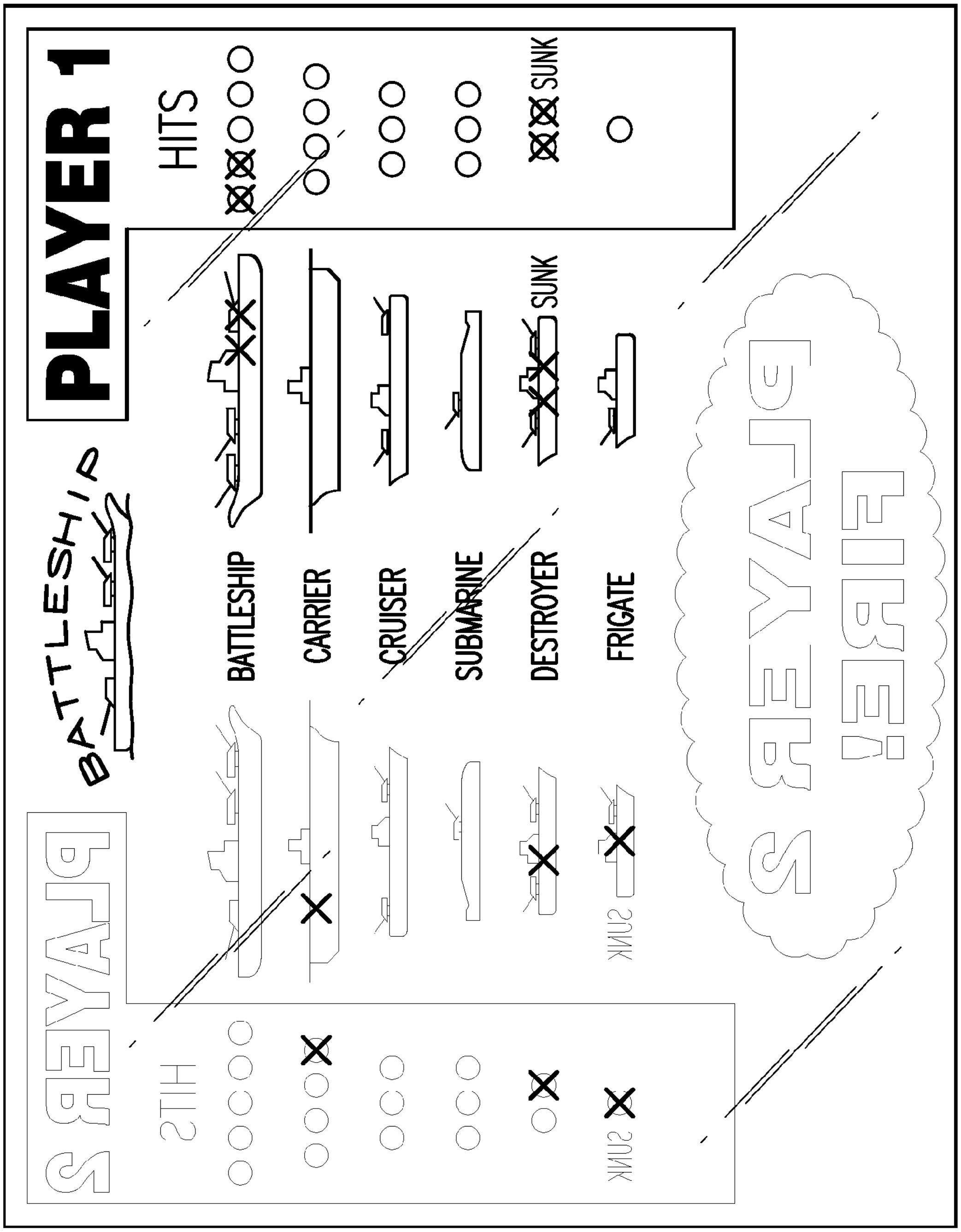

FIGS. 3 and 4 also illustrate use of the transparent feature display 10 as a primary game display with players always seeing the opponent. Games such as Texas Hold-em poker or Battleship, for example. For Battleship (FIG. 4), the outcome of each player's action could be displayed with video animation on the shared transparent display (a hit or miss of the opponent's ship).

Yet another embodiment is to have the transparent shared feature display 10 be the main game display that incorporates a mechanism such as an electronic shutter to make the display opaque during single player use and then transparent during head to head play. Alternately, certain areas of each player's shared display 10 may be dedicated to their individual game information while a larger central portion, for example, may be shared by both players. FIGS. 3 and 4 illustrate examples of this style of presentation for games similar to Connect4 and Battleship, respectively. In still other embodiments, portions of the shared display 10 may be permanently masked on one side or the other to allow individual player displays while retaining a common transparent portion for display of common information.

Some, or all, of the displays discussed above may include touchscreen input capability. In particular, the shared transparent display may have a touchscreen on both sides of the display to allow each of the players in interact with the game.

In an embodiment the gaming terminals 12*a*, 12*b* of FIG. 1 may be under control of a single or separate processors (described below) and are configured to control the terminal displays 14*a*, 14*b* to display individual base games to the two players playing the terminals 12*a*, 12*b*. For example the base games may be video slot games, electro-mechanical stepper-type slot machine games or other wagering types of games. As shown in FIG. 1 the gaming terminals 12*a*, 12*b* may take the form of low profile, slant-type gaming machines the form-type of which is well known in the art and which receive their designation since the primary game displays 14*a*, 14*b* are slanted from the vertical. In another embodiment the terminals primary game displays 14*a*, 14*b* may be arranged horizontally or may be embodied as a single large horizontal table display spanning both gaming terminals 12*a*, 12*b*. The terminals 12*a*, 12*b* are disposed back-to-back such that the transparent shared display 10 up stands between the gaming terminals 12*a*, 12*b* as shown such that the players of the gaming terminals 12*a*, 12*b*, when seated at the gaming terminals 12*a*, 12*b* face each other through the transparent shared display 10.

Each gaming terminal 12*a*, 12*b* is provided with player input interfaces which may be buttons 16 disposed on a button deck 18 and/or the terminal displays 14*a*, 14*b* include a touch screen interface. The operation of an example of the utility of the arrangement of the gaming terminals 12*a*, 12*b* and shared display 10 will now be described. It should be understood that the following description is but one example.

Figure 5:
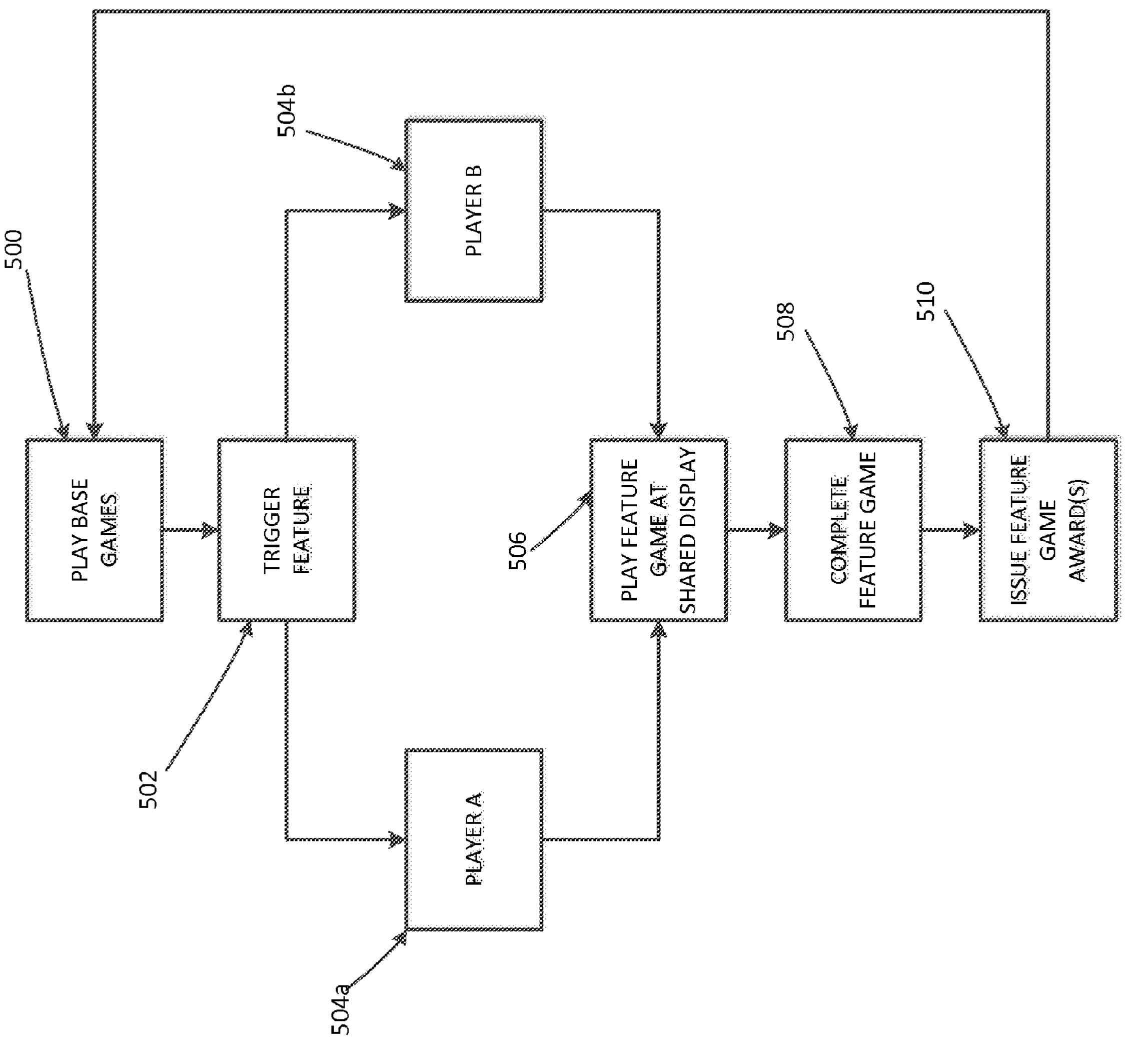
FIG. 5 is a logic diagram for operation of an example of a game feature according to the present invention.

With reference to FIG. 5, at 500 the players play their individual games on their respective gaming terminals 12*a*, 12*b*. The play of the games results in winning and losing outcomes and for winning outcomes of the base game the players receive awards such as game credits. At 502 a game feature is triggered by, for example, a symbol based trigger where one or both players obtains a triggering outcome from the play of the base games or from a terminal, terminal bank or a random, non-symbol based game level mystery feature trigger of the type, for example, described in, for example, Torango, U.S. Pat. No. 6,592,460 issued Jul. 15, 2003 and titled "Progressive Wagering System", or Olive, U.S. Pat. No. 8,663,000 issued Mar. 4, 2014 and titled "Slot Machine Game and System with Improved Jackpot Feature" or a system based mystery trigger such as various embodiments of Torango and Olive above as well as Acres, et al U.S. Pat. No. RE 38,812 re-issued Oct. 4, 2005 and titled "Method and Apparatus for Operating Networked Gaming Devices", the disclosures of which are incorporated by reference. In response to the triggering of the feature at 502 a feature game is presented at the shared transparent display 10 for either competitive or collaborative play by the players at 504*a*, 504*b*. For example, as shown in FIGS. 2 and 3 the play may be alternate move games such as Poker, Backgammon or the well-known Battleship game (FIG. 4). The game may also be a shared slot machine game presentation or a dice rolling game such as Monopoly®. At 506 the players play the game at the shared feature display 10 which, by virtue of its transparency or semi-transparency, enables the players to see each other through the display as the various moves are made. Game features, characters, pieces, cards, die, and game boards are displayed that the shared feature display 10 to show game progress. As stated above the shared feature display 10 may include a touch screen player interfaces so the players can provide input for the play of the feature game solely or in addition to the use of buttons 16. In an embodiment the base games are disabled during the play of the feature game. In another embodiment the base games played on the player's game terminals in the arrangement are played either in a base game mode or a feature mode to drive the progress of the feature game toward its conclusion. For example, in a feature game, players serially play their base games to move either competitive collaborative game pieces such as race cars, horses, Greyhounds or the like with base game outcomes. At 508 the feature game is played to completion and at 510 any feature game awards are issued and the feature is concluded returning the players to the play of their base games.

In an embodiment where content, either game related content or non-game related content, is displayed on the shared display 10 the content may be opaque so as to obscure the view of the player on the other gaming terminal 12*a*, 12*b* or some or all of the content may be semi-opaque or translucent so that the content can be viewed but the player at the opposing gaming terminal 12*a*, 12*b* can still be at least partially seen.

In a first state where no feature is presented on the shared feature display 10, it may be controlled to be greyed out or otherwise to obscure the view of an opposing player or may display advertising or a pleasing scene for the players. It may also assume the first state when no other player is playing the opposite gaming terminal The transparent shared display then assumes a second state to display the feature game when the same is triggered.

Figure 6:
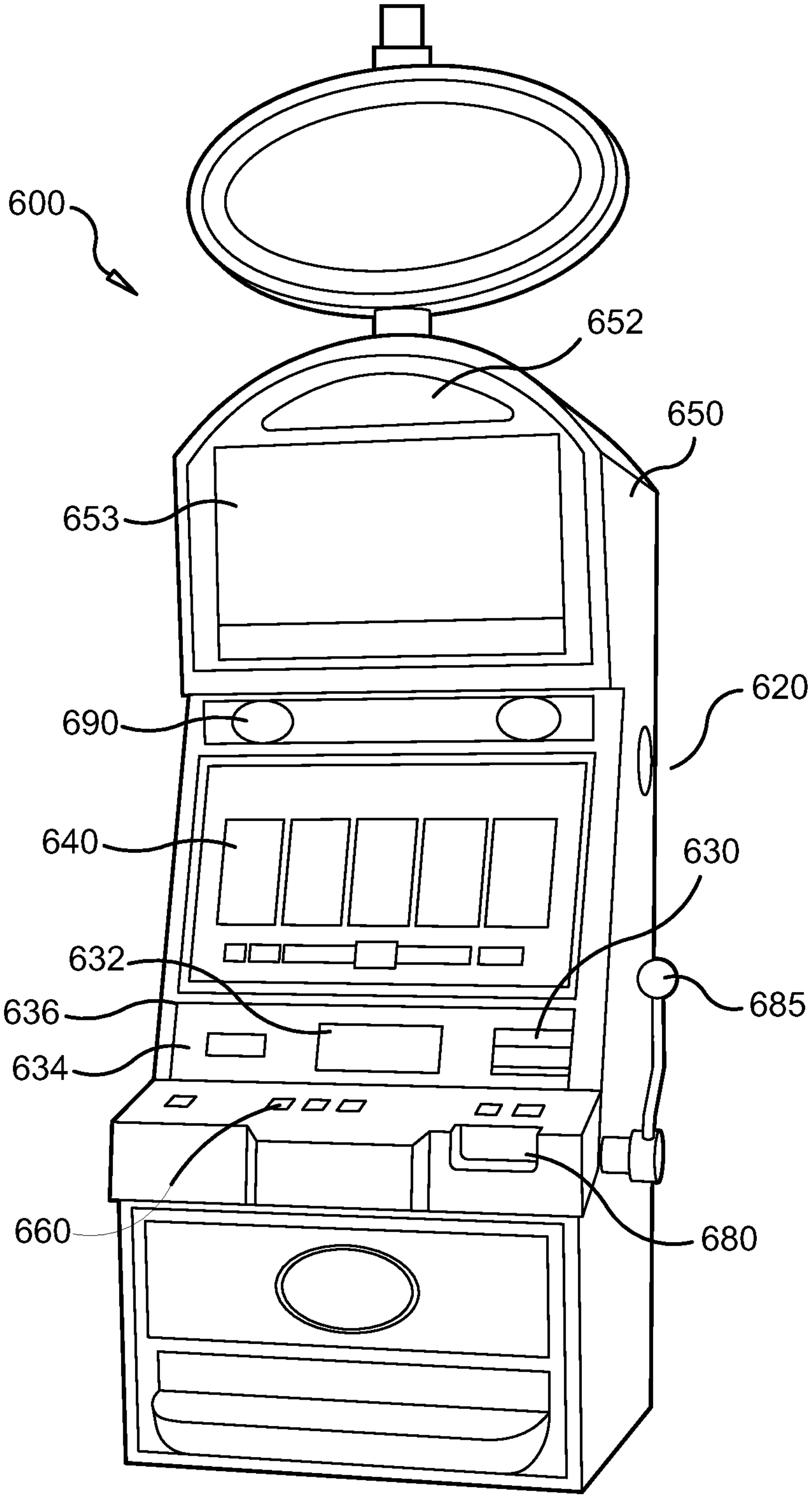
FIG. 6 is a perspective view of a basic gaming machine in accordance with one or more embodiments.

Referring to FIG. 6 there is shown a gaming machine 600 for the purpose of describing, somewhat generically, the various components which may be provided in the gaming terminals 12*a*, 12*b*. While in the preferred embodiment the gaming terminals 12*a*, 12*b* are embodied as slant-type cabinet gaming terminals so the players can view one another through the shared display 10, the following description of an upright gaming machine 600 provides the reader with an understanding of the components found in either upright or slant-type gaming machines. Further the transparent shared feature display 10 could be disposed to one side of back-to-back upright gaming machines 600 for the purposes as described above.

The gaming machine 600 includes a cabinet housing 620, primary game display 640 upon which a primary game and feature game may be displayed, top box 650 which may display multiple progressives that may be won during play of the feature game, player-activated buttons 660, player tracking panel 636, bill/voucher acceptor 680 and one or more speakers 690. Cabinet housing 620 may be a self-standing unit that is generally rectangular in shape and may be manufactured with reinforced steel or other rigid materials which are resistant to tampering and vandalism. Cabinet housing 620 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 600 or thin client capability such as that incorporating some of the capability of a remote server.

In one or more embodiments, cabinet housing 620 houses a processor, circuitry, and software (not shown) for receiving signals from the player-activated buttons 660, operating the games, and transmitting signals to the respective displays and speakers. Any shaped cabinet may be implemented with any embodiment of gaming machine 600 so long as it provides access to a player for playing a game. For example, cabinet 620 may comprise a slant-top, bar-top, or table-top style cabinet, including a Bally Cinevision™ or CineReels™ cabinet. The operation of gaming machine 600 is described more fully below.

The plurality of player-activated buttons 660 may be used for various functions such as, but not limited to, selecting a wager denomination, selecting a game to be played, selecting a wager amount per game, initiating a game, or cashing out money from gaming machine 600. Buttons 660 may be operable as input mechanisms and may include mechanical buttons, electromechanical buttons or touch screen buttons. Optionally, a handle 685 may be rotated by a player to initiate a game.

In one or more embodiments, buttons 660 may be replaced with various other input mechanisms known in the art such as, but not limited to, a touch screen system, touch pad, track ball, mouse, switches, toggle switches, or other input means used to accept player input. In one or more embodiments, the control deck may be an enhanced game interface system similar to a Bally iDeck™ that includes a display system, a sensor system, a feedback system, and one or more computing systems disclosed in at least U.S. patent application Ser. No. 12/619,635, entitled "Gesture Enhanced Input Device," filed Nov. 16, 2009, which is incorporated herein by reference in its entirety.

One other example input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 620 may optionally include top box 650 which contains "top glass" 652 comprising advertising or payout information related to the game or games available on gaming machine 600. Player tracking panel 636 includes player tracking card reader 634 and player tracking display 632. Voucher printer 630 may be integrated into player tracking panel 636 or installed elsewhere in cabinet housing 620 or top box 650.

Game display 640 may present a game of chance wherein a player receives one or more outcomes from a set of potential outcomes. For example, one such game of chance is a video slot machine game. In other aspects of the invention, gaming machine 600 may present a video or mechanical reel slot machine, a video poker game, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 640 is, typically, a CRT or a flat-panel display in the form of, but not limited to, liquid crystal, plasma, electroluminescent, vacuum fluorescent, field emission, or any other type of panel display known or developed in the art. Game display 640 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 640 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 640 may also present information such as, but not limited to, player information, advertisements and casino promotions, graphic displays, news and sports updates, or even offer an alternate game. This information may be generated through a host computer networked with gaming machine 600 on its own initiative or it may be obtained by request of the player using either one or more of the plurality of player-activated buttons 660; the game display itself, if game display 640 comprises a touch screen or similar technology; buttons (not shown) mounted about game display 640 which may permit selections such as those found on an ATM machine, where legends on the screen are associated with respective selecting buttons; or any player input device that offers the required functionality.

Cabinet housing 620 incorporates a single game display 640. However, in alternate embodiments, cabinet housing 620 or top box 650 may house one or more additional displays 653 or components used for various purposes including additional game play screens, animated "top glass," progressive meters or mechanical or electromechanical devices (not shown) such as, but not limited to, wheels, pointers or reels. The additional displays may or may not include a touch screen or touch glass system. In particular, as illustrated in FIGS. 1 and 2 and discussed above, these displays may have transparent portions to be shared between two gaming machines 600 in accordance with one or more embodiments.

Gaming machine 600 includes various electronic components for generating sound. Note that the functionality discussed herein may be implemented using software and/or hardware techniques and components known to those skilled in the art. The processor with associated memory (not shown) may provide digital sound files, e.g., in a WAV or MP3 format, to a sound card (not shown). Particular sound files may be selected by the processor to enable the gaming machine 600 to make various sounds according to factors such as whether the machine is being played, and whether a jackpot has been won. A typical sound card includes a digital signal processor (DSP) that handles most computations, a digital to analog converter (DAC) for audio leaving the card, a read-only memory (ROM) or Flash memory for storing data, and a jack for connecting to speakers 690. Moreover, the sound card may have a microphone jack and an analog-to-digital converter (ADC) for converting analog audio signals from a microphone (not shown). The sound card translates the control signals to left- and right-channel (and any other channels) audio signals that produce sound by exciting the speakers 690.

Note that two audio channels are used to provide a stereo effect in the present example, but fewer or more channels may be used according to the audio quality or effect that is desired. For example, multiple channels of audio may be used to provide multiple sounds such as stereo music and the like.

Figure 7A:
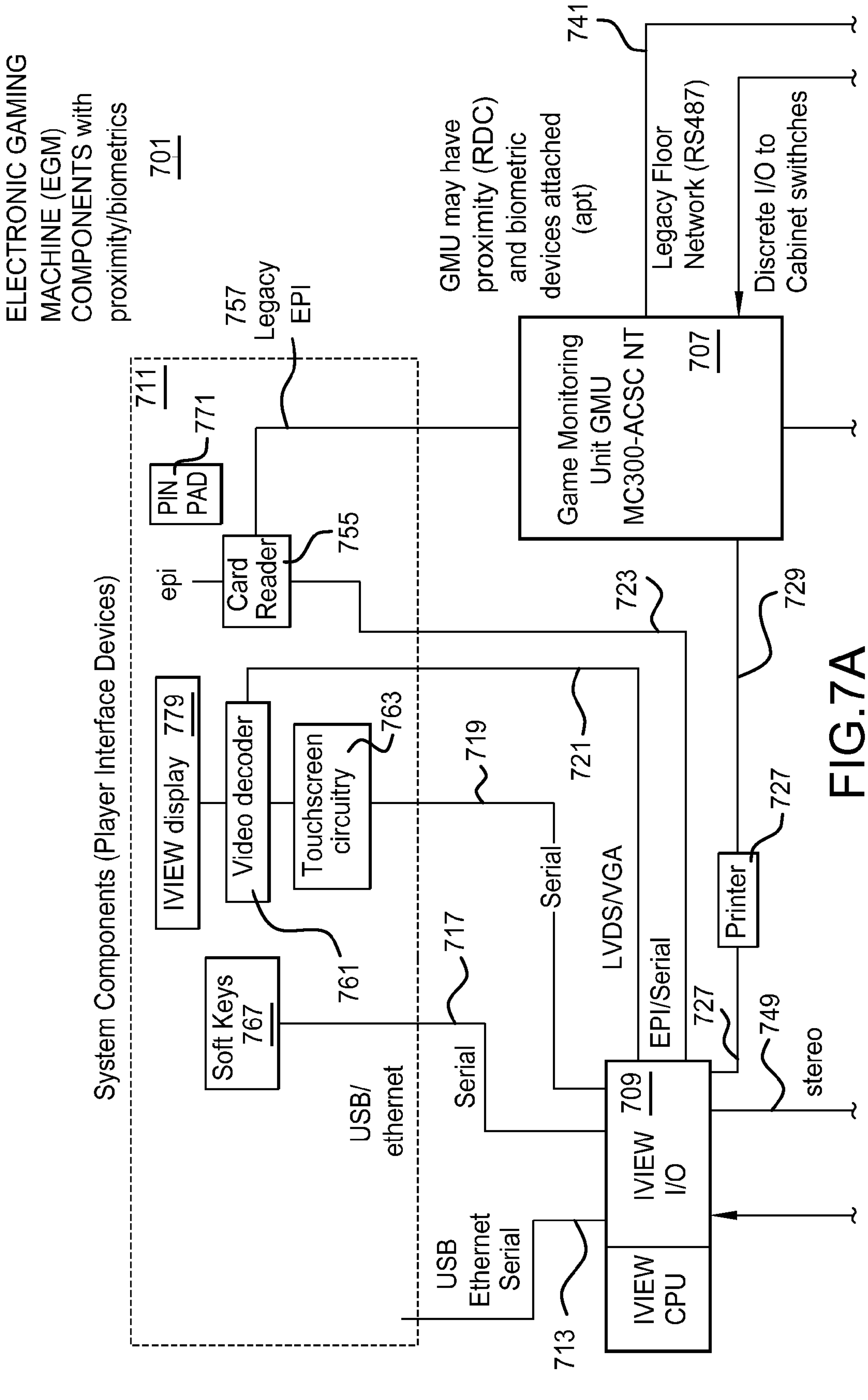
FIGS. 7A and 7B represent a block diagram of the physical and logical components of the gaming machine of FIG. 6 in accordance with one or more embodiments.
Figure 7B:
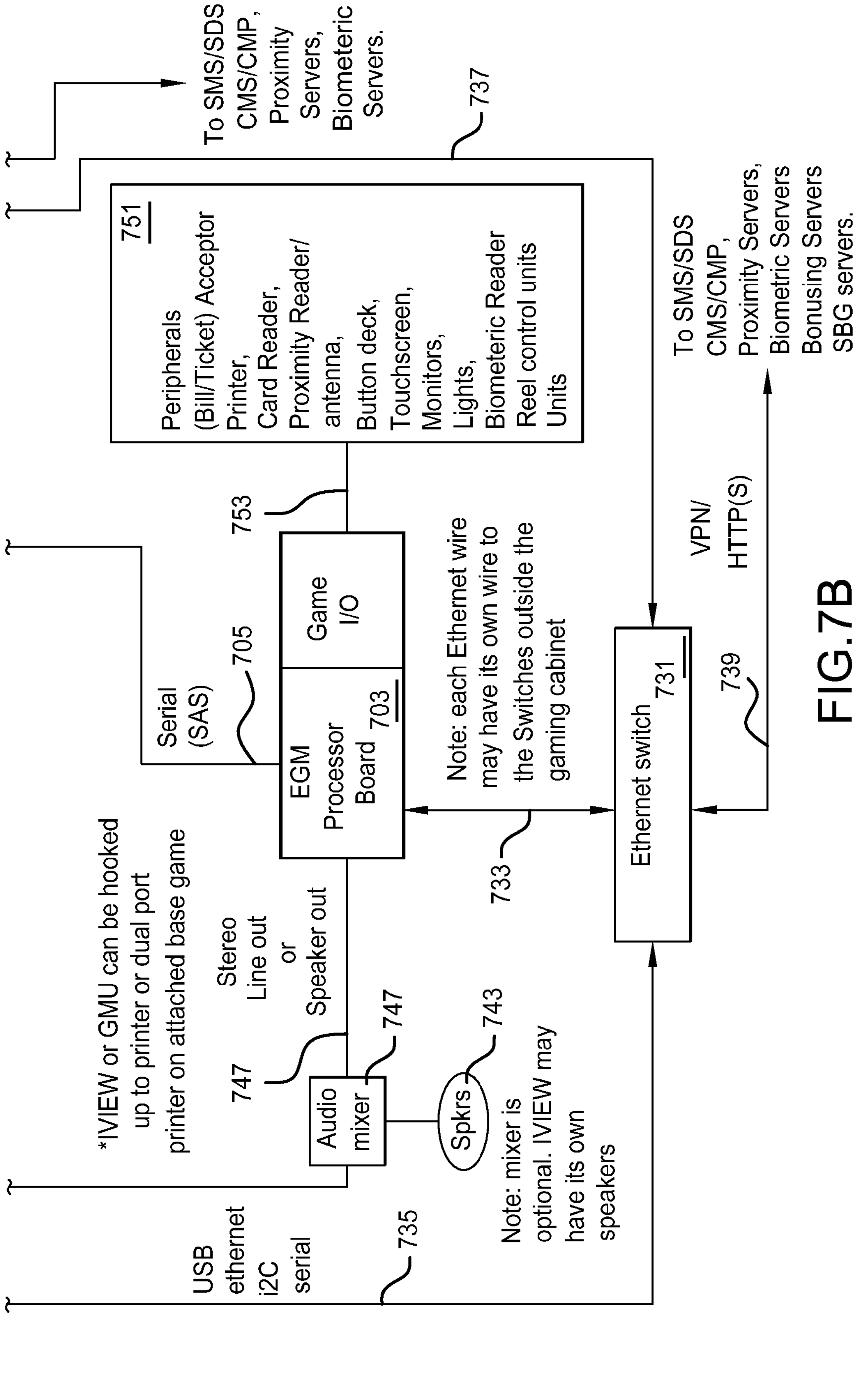

Referring to FIGS. 7A and 7B, electronic gaming machine 701 is shown in accordance with one or more embodiments. Electronic gaming machine 701 includes base game integrated circuit board 703 (EGM Processor Board) connected through serial bus line 705 to game monitoring unit (GMU) 707 (such as a Bally MC300 or ACSC NT), and player interface integrated circuit board (PIB) 709 connected to player interface devices 711 over bus lines 713, 715, 717, 719, 721, 723. Printer 725 is connected to PIB 709 and GMU 707 over bus lines 727, 729. Base game integrated circuit board 703, PIB 709, and GMU 707 connect to Ethernet switch 731 over bus lines 733, 735, 737. Ethernet switch 731 connects to a slot management system (SMS) and a casino management system (CMS) network over bus line 739. GMU 707 also may connect to the SMS and CMS network over bus line 741. Speakers 743 connect through audio mixer 745 and bus lines 747, 749 to base game integrated circuit board 703 and PIB 709. The proximity and biometric devices and circuitry may be installed by upgrading a commercially available PIB 709, such as a Bally iView unit. Coding executed on base game integrated circuit board 703, PIB 709, and/or GMU 707 may be upgraded to integrate a game having adjustable multi-part indicia as is more fully described herein.

Peripherals 751 connect through I/O board 753 to base game integrated circuit board 703. For example, a bill/ticket acceptor is typically connected to a game input-output board 753 which is, in turn, connected to a conventional central processing unit ("CPU") base game integrated circuit board 703, such as an Intel Pentium microprocessor mounted on a gaming motherboard. I/O board 753 may be connected to base game integrated circuit board 703 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 703 executes a game program that causes base game integrated circuit board 703 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 753 to base game integrated circuit board 703 which, in turn, assigns an appropriate number of credits for play in accordance with the game program. The player may further control the operation of the gaming machine by way of other peripherals 751, for example, to select the amount to wager via electromechanical or touch screen buttons. The game starts in response to the player operating a start mechanism such as a handle or touch screen icon, including the icons described above with respect to the Bally iDeck™. The game program includes a random number generator to provide a display of randomly selected indicia on one or more displays. In some embodiments, the random generator may be physically separate from gaming machine 700; for example, it may be part of a central determination host system which provides random game outcomes to the game program. Thereafter, the player may or may not interact with the game through electromechanical or touch screen buttons to change the displayed indicia. Finally, base game integrated circuit board 703 under control of the game program and OS compares the final display of indicia to a pay table. The set of possible game outcomes may include a subset of outcomes related to the triggering of a feature game. In the event the displayed outcome is a member of this subset, base game integrated circuit board 703, under control of the game program and by way of I/O Board 753, may cause feature game play to be presented on a feature display.

Predetermined pay out amounts for certain outcomes, including feature game outcomes, are stored as part of the game program. Such pay out amounts are, in response to instructions from base game integrated circuit board 703, provided to the player in the form of coins, credits or currency via I/O board 753 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 707 includes an integrated circuit board and GMU processor and memory including coding for network communications, such as the G2S (game-to-system) protocol from the Gaming Standards Association, Las Vegas, Nev., used for system communications over the network. As shown, GMU 707 may connect to card reader 755 through bus 757 and may thereby obtain player card information and transmit the information over the network through bus 741. Gaming activity information may be transferred by the base game integrated circuit board 703 to GMU 707 where the information may be translated into a network protocol, such as S2S, for transmission to a server, such as a player tracking server, where information about a player's playing activity may be stored in a designated server database.

PIB 709 includes an integrated circuit board, PID processor, and memory which includes an operating system, such as Windows CE, a player interface program which may be executable by the PID processor together with various input/output (I/O) drivers for respective devices which connect to PIB 709, such as player interface devices 711, and which may further include various games or game components playable on PIB 709 or playable on a connected network server and PIB 709 is operable as the player interface. PIB 709 connects to card reader 755 through bus 723, display 759 through video decoder 761 and bus 721, such as an LVDS or VGA bus.

As part of its programming, the PID processor executes coding to drive display 759 and provide messages and information to a player. Touch screen circuitry interactively connects display 759 and video decoder 761 to PIB 709; such that a player may input information and cause the information to be transmitted to PIB 709 either on the player's initiative or responsive to a query by PIB 709. Additionally soft keys 765 connect through bus 717 to PIB 709 and operate together with display 759 to provide information or queries to a player and receive responses or queries from the player. PIB 709, in turn, communicates over the CMS/SMS network through Ethernet switch 731 and busses 735, 739 and with respective servers, such as a player tracking server.

Player interface devices 711 are linked into the virtual private network of the system components in gaming machine 701. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView processing board and game monitoring unit (GMU) processing board. The GMU and iView can combined into one like the commercially available Bally GTM iView device. This device may have a video mixing technology to mix the EGM processor's video signals with the iView display onto the top box monitor or any monitor on the gaming device.

Figure 8:
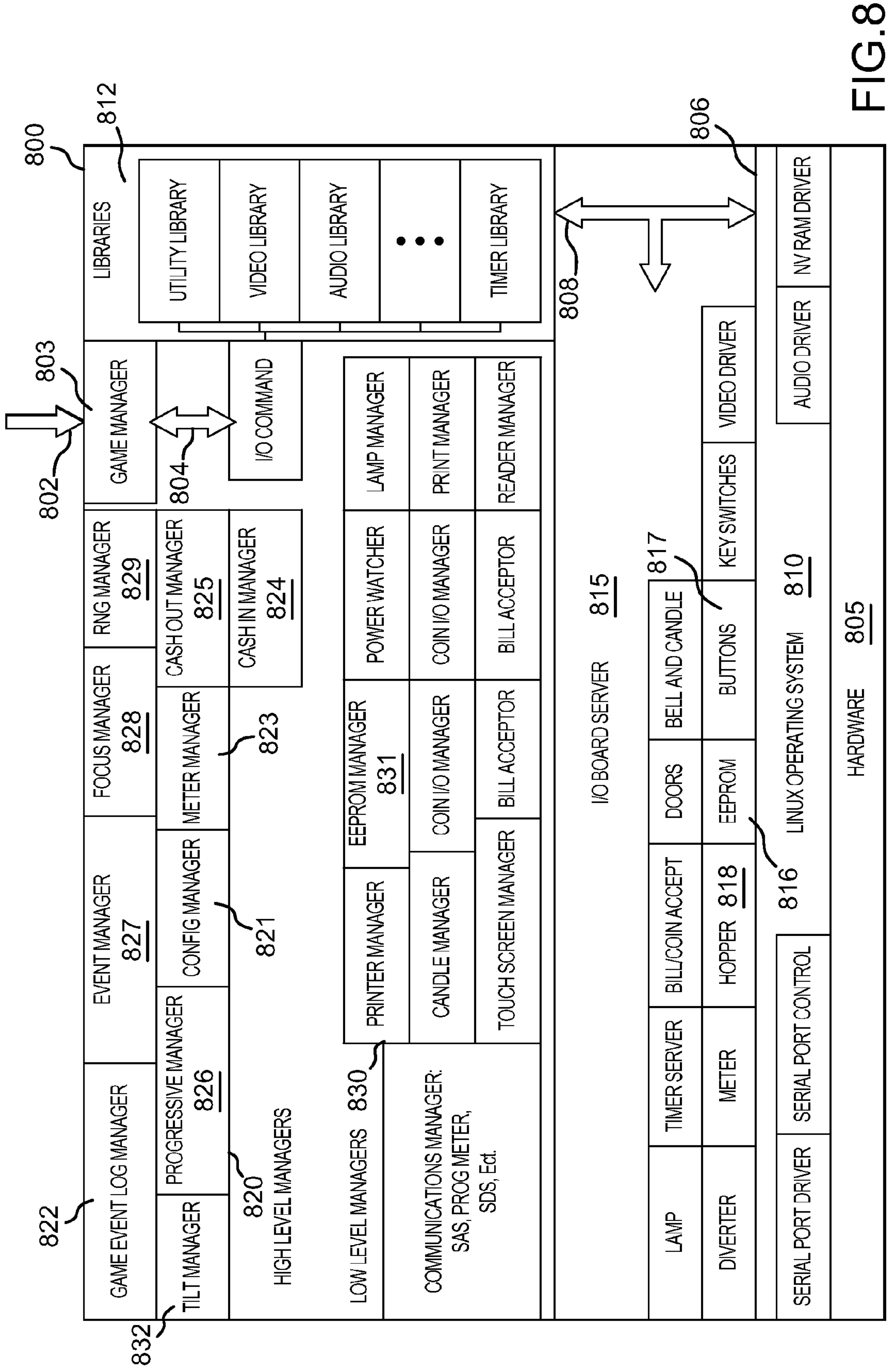
FIG. 8 is a block diagram of the logical components of a gaming kernel in accordance with one or more embodiments.

In accordance with one or more embodiments, FIG. 8 is a functional block diagram of a gaming kernel 800 of a game program under control of base game integrated circuit board 803. The game program uses gaming kernel 800 by calling into application programming interface (API) 802, which is part of game manager 803. The components of game kernel 800 as shown in FIG. 8 are only illustrative, and should not be considered limiting. For example, the number of managers may be changed, additional managers may be added or some managers may be removed without deviating from the scope and spirit of the invention.

As shown in the example, there are three layers: a hardware layer 805; an operating system layer 810, such as, but not limited to, Linux; and a game kernel layer 800 having game manager 803 therein. In one or more embodiments, the use of a standard operating system 810, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 800 executes at the user level of the operating system 810, and itself contains a major component called the I/O Board Server 815. To properly set the bounds of game application software (making integrity checking easier), all game applications interact with gaming kernel 800 using a single API 802 in game manager 803. This enables game applications to make use of a well-defined, consistent interface, as well as making access points to gaming kernel 800 controlled, where overall access is controlled using separate processes.

For example, game manager 803 parses an incoming command stream and, when a command dealing with I/O comes in (arrow 804), the command is sent to an applicable library routine 812. Library routine 812 decides what it needs from a device, and sends commands to I/O Board Server 815 (see arrow 808). A few specific drivers remain in operating system 810's kernel, shown as those below line 806. These are built-in, primitive, or privileged drivers that are (i) general (ii) kept to a minimum and (iii) are easier to leave than extract. In such cases, the low-level communications is handled within operating system 810 and the contents passed to library routines 812.

Thus, in a few cases library routines may interact with drivers inside operating system 810, which is why arrow 808 is shown as having three directions (between library utilities 812 and I/O Board Server 815, or between library utilities 812 and certain drivers in operating system 810). No matter which path is taken, the logic needed to work with each device is coded into modules in the user layer of the diagram. Operating system 810 is kept as simple, stripped down, and common across as many hardware platforms as possible. The library utilities and user-level drivers change as dictated by the game cabinet or game machine in which it will run. Thus, each game cabinet or game machine may have an base game integrated circuit board 1503 connected to a unique, relatively dumb, and as inexpensive as possible I/O adapter board 1540, plus a gaming kernel 800 which will have the game-machine-unique library routines and I/O Board Server 815 components needed to enable game applications to interact with the gaming machine cabinet. Note that these differences are invisible to the game application software with the exception of certain functional differences (i.e., if a gaming cabinet has stereo sound, the game application will be able make use of API 802 to use the capability over that of a cabinet having traditional monaural sound).

Game manager 803 provides an interface into game kernel 800, providing consistent, predictable, and backwards compatible calling methods, syntax, and capabilities by way of game application API 802. This enables the game developer to be free of dealing directly with the hardware, including the freedom to not have to deal with low-level drivers as well as the freedom to not have to program lower level managers 830, although lower level managers 830 may be accessible through game manager 803's interface 802 if a programmer has the need. In addition to the freedom derived from not having to deal with the hardware level drivers and the freedom of having consistent, callable, object-oriented interfaces to software managers of those components (drivers), game manager 803 provides access to a set of upper level managers 820 also having the advantages of consistent callable, object-oriented interfaces, and further providing the types and kinds of base functionality required in casino-type games. Game manager 803, providing all the advantages of its consistent and richly functional interface 802 as supported by the rest of game kernel 800, thus provides a game developer with a multitude of advantages.

Game manager 803 may have several objects within itself, including an initialization object (not shown). The initialization object performs the initialization of the entire game machine, including other objects, after game manager 803 has started its internal objects and servers in appropriate order. In order to carry out this function, the kernel's configuration manager 821 is among the first objects to be started; configuration manager 821 has data needed to initialize and correctly configure other objects or servers.

The upper level managers 820 of game kernel 800 may include game event log manager 822 which provides, at the least, a logging or logger base class, enabling other logging objects to be derived from this base object. The logger object is a generic logger; that is, it is not aware of the contents of logged messages and events. The log manager's (822) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 823 manages the various meters embodied in the game kernel 800. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 823 receives its initialization data for the meters, during start-up, from configuration manager 821. While running, the cash in (1124) and cash out (1125) managers call the meter manager's (1123) update functions to update the meters. Meter manager 823 will, on occasion, create backup copies of the soft meters by storing the soft meters' readings in EEPROM. This is accomplished by calling and using EEPROM manager 831.

In accordance with still other embodiments, progressive manager 826 manages progressive games playable from the game machine. Event manager 827 is generic, like log manager 822, and is used to manage various gaming machine events. Focus manager 828 correlates which process has control of various focus items. Tilt manager 832 is an object that receives a list of errors (if any) from configuration manager 821 at initialization, and during game play from processes, managers, drivers, etc. that may generate errors. Random number generator manager 829 is provided to allow easy programming access to a random number generator (RNG), as a RNG is required in virtually all casino-style (gambling) games. RNG manager 829 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 825 has the responsibility of configuring and managing monetary output devices. During initialization, cash out manager 825, using data from configuration manager 821, sets the cash out devices correctly and selects any selectable cash out denominations. During play, a game application may post a cash out event through the event manager 827 (the same way all events are handled), and using a call-back posted by cash out manager 825, cash out manager 825 is informed of the event. Cash out manager 825 updates the credit object, updates its state in non-volatile memory, and sends an appropriate control message to the device manager that corresponds to the dispensing device. As the device dispenses dispensable media, there will typically be event messages being sent back and forth between the device and cash out manager 825 until the dispensing finishes, after which cash out manager 825, having updated the credit manager and any other game state (such as some associated with meter manager 823) that needs to be updated for this set of actions, sends a cash out completion event to event manager 827 and to the game application thereby. Cash in manager 824 functions similarly to cash out manager 825, only controlling, interfacing with, and taking care of actions associated with cashing in events, cash in devices, and associated meters and crediting.

In a further example, in accordance with one or more embodiments, I/O server 815 may write data to the gaming machine EEPROM memory, which is located in the gaming machine cabinet and holds meter storage that must be kept even in the event of power failure. Game manager 803 calls the I/O library functions to write data to the EEPROM. The I/O server 815 receives the request and starts a low priority EEPROM thread 816 within I/O server 815 to write the data. This thread uses a sequence of 8 bit command and data writes to the EEPROM device to write the appropriate data in the proper location within the device. Any errors detected will be sent as IPC messages to game manager 803. All of this processing is asynchronous.

In accordance with one embodiment, button module 817 within I/O server 815, polls (or is sent) the state of buttons every 2 ms. These inputs are debounced by keeping a history of input samples. Certain sequences of samples are required to detect a button was pressed, in which case the I/O server 815 sends an inter-process communication event to game manager 803 that a button was pressed or released. In some embodiments, the gaming machine may have intelligent distributed I/O which debounces the buttons, in which case button module 817 may be able to communicate with the remote intelligent button processor to get the button events and simply relay them to game manager 803 via IPC messages. In still another embodiment, the I/O library may be used for pay out requests from the game application. For example, hopper module 818 must start the hopper motor, constantly monitor the coin sensing lines of the hopper, debounce them, and send an IPC message to the game manager 803 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 9A:
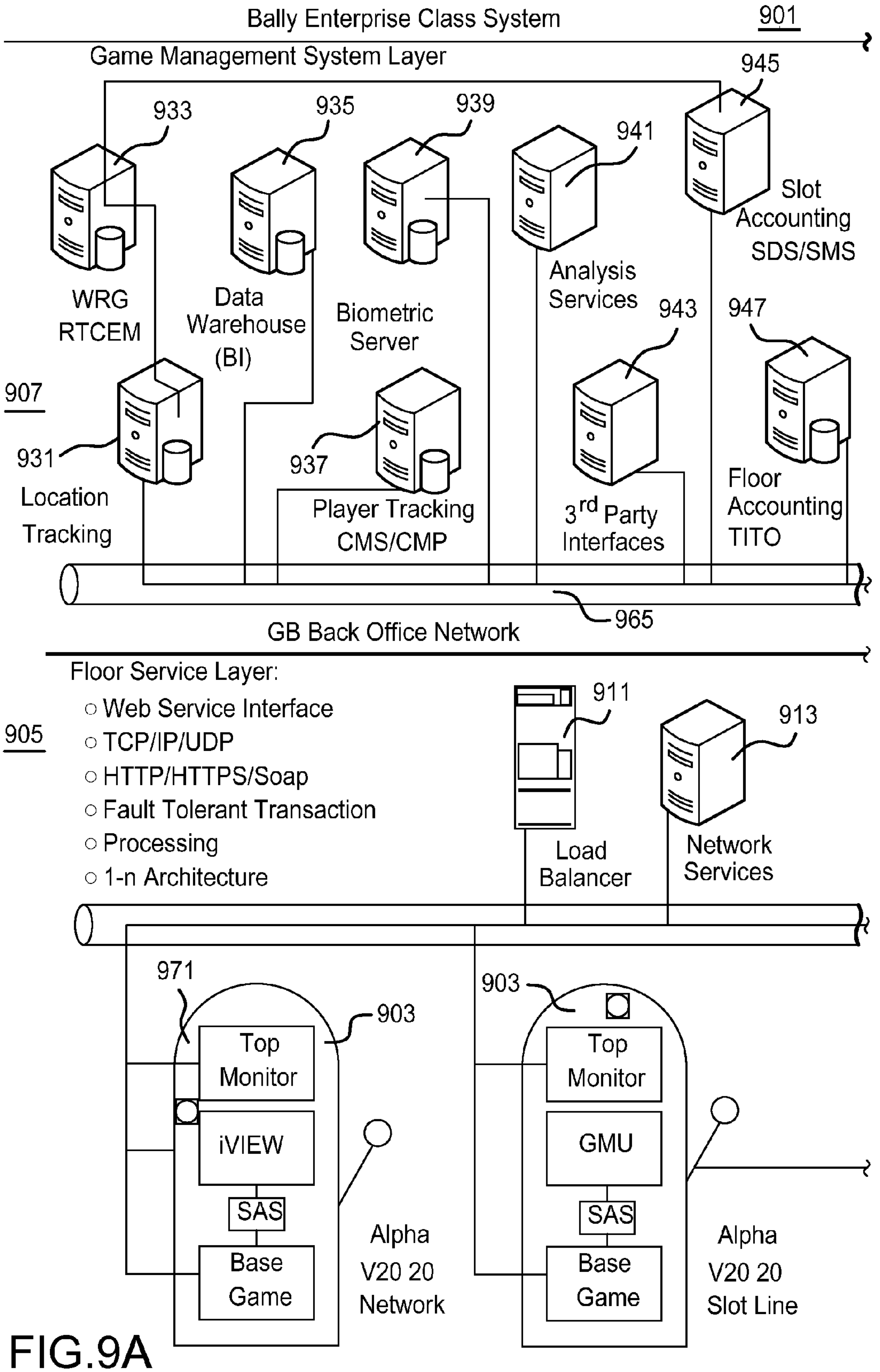
FIGS. 9A and 9B show the hardware elements of a networked gaming system in accordance with one or more embodiments.
Figure 9B:
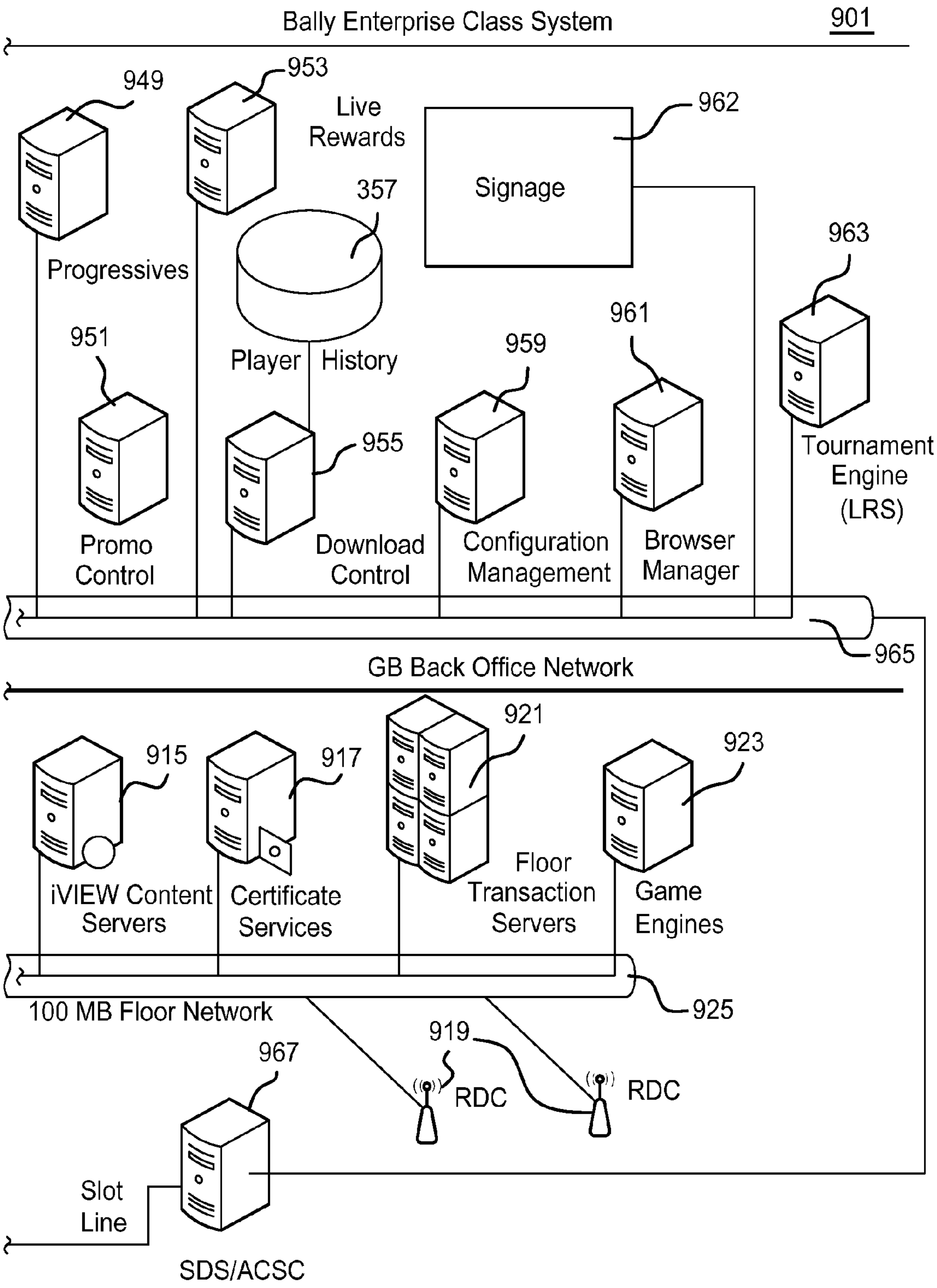

Referring to FIGS. 9A and 9B, enterprise gaming system 901 is shown in accordance with one or more embodiments. Enterprise gaming system 901 may include one casino or multiple locations and generally includes a network of gaming machines 903, floor management system (SMS) 905, and casino management system (CMS) 907. SMS 905 may include load balancer 911, network services servers 913, player interface (iView) content servers 915, certificate services server 95, floor radio dispatch receiver/transmitters (RDC) 919, floor transaction servers 921 and game engines 923, each of which may connect over network bus 925 to gaming machines 903. CMS 907 may include location tracking server 931, WRG RTCEM server 933, data warehouse server 935, player tracking server 937, biometric server 939, analysis services server 941, third party interface server 943, slot accounting server 945, floor accounting server 947, progressives server 949, promo control server 951, feature game (such as Bally Live Rewards) server 953, download control server 955, player history database 957, configuration management server 959, browser manager 961, tournament engine server 963 connecting through bus 965 to server host 967 and gaming machines 903. The various servers and gaming machines 903 may connect to the network with various conventional network connections (such as, for example, USB, serial, parallel, RS485, Ethernet). Additional servers which may be incorporated with CMS 907 include a responsible gaming limit server (not shown), advertisement server (not shown), and a control station server (not shown) where an operator or authorized personnel may select options and input new programming to adjust each of the respective servers and gaming machines 903. SMS 905 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 903 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 907 and/or SMS 905 servers and devices, firmware, media, operating systems, and configurations may be downloaded to the system components of respective gaming machines for upgrading or managing floor content and offerings in accordance with operator selections or automatically depending upon CMS 907 and SMS 905 master programming The data and programming updates to gaming machines 903 are authenticated using conventional techniques prior to install on the system components.

In various embodiments, any of the gaming machines 903 may be a mechanical reel spinning slot machine or a video slot machine or a gaming machine offering one or more of the above described games including a group play game. Alternately, gaming machines 903 may provide a game with a simulated musical instrument interface as a primary or base game or as one of a set of multiple primary games selected for play by a random number generator. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Play Gaming," filed on Nov. 9, 2007, which is hereby incorporated by reference in its entirety for all purposes.

Figure 10:
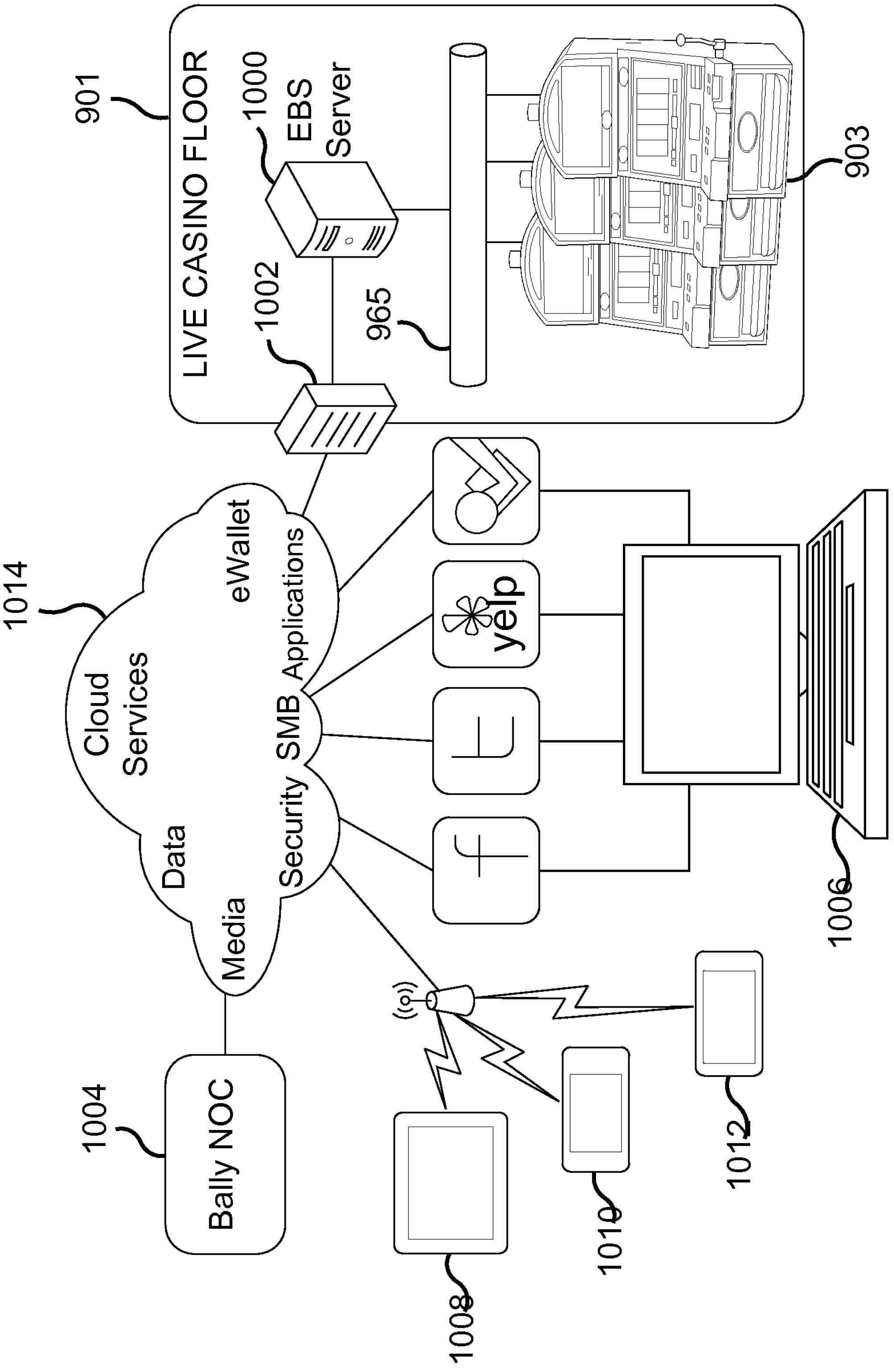
FIG. 10 is a diagram showing an example of an architecture for tying a casino enterprise network to an external provider of games and content to Internet or broadband communication capable devices in accordance with one or more embodiments.

All or portions of the present invention may also be implemented or promoted by or through a system as suggested in FIG. 10. At 901 is the gaming system of FIG. 9, which may be hosted at a casino property enterprise, across several casino enterprises or by a third party host. As described above, the gaming system 901 has a network communication bus 965 providing for communication between the gaming terminals 903 and various servers. To provide the functionality illustrated in FIG. 10, a bonusing server 1000, such as a Bally Elite Bonusing Server is connected to the network communication bus 965 (FIG. 9) for communication to the gaming system 901, the gaming terminals 903 and the various servers and other devices as described above. Through a secure network firewall 1002 the bonusing server 1000 is in communication with a cloud computing/storage service 1004 which may be hosted by the casino enterprise, a licensed third party or if permitted by gaming regulators an unlicensed provider. For example the cloud service 1004 may be as provided by Microsoft® Private Cloud Solutions offered by Microsoft Corp. of Redmond, Wash., USA. The cloud service 1004 provides various applications which can be accessed and delivered to, for example, personal computers 1006, portable computing devices such as computer tablets 1008, personal digital assistants (PDAs) 1010 and cellular devices 1012 such as telephones and smart phones. As but an example, the cloud service 1004 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 1004 includes security provide for secure communication with the cloud service 1004 between the player/users and the cloud service 1004 and between the cloud service 1004 and the gaming system 901. Security applications may be through encryption, the use of personal identification numbers (PINS) or other devices and systems. As suggested in FIG. 10, the cloud service 1014 stores player/user data retrieved from players/users and from the gaming system 901.

The players/users may access the cloud service 1004 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the present invention. At their smart phone 1012 the player/user sends a request to the clout service 1004 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 1004 forwards the inquiry to the bonusing servicer 1000 which, in turn, confirms the PIN and retrieves the requested information from the data warehouse 935 (FIG. 9) or player tracking CMS/CMP server 937 (FIG. 9). Alternatively the data may be stored in the cloud service 1004 and routinely updated from the data warehouse 935 or player tracking CMS/CMP server 937. In this instance the request would be responded to from data residing with the cloud service 1004. The information is formatted by the cloud server 1004 application and delivered to the player/user. The delivery may be formatted based upon the player/user's device operating system (OS), display size or the like.

The cloud service 1000 may also host game applications to provide virtual instances of games for free, promotional, or where permitted, P2P (Pay to Play) supported gaming. Third party developers may also have access to placing applications with the cloud service 1004 through, for example a national operations center (Bally NOC 1014). A game software manufacturer such as Bally Gaming, Inc. may also provide game applications on its own or on behalf of the casino enterprise.

Other media such as advertising, notices (such as an upcoming tournament) may also be provided to the cloud service 1004. When a player/user accesses the cloud service 1004 certain media may be delivered to the player/user in a manner formatted for their application and device.

In another embodiment each player may possess a portable gaming device such as a tablet or notebook computer and two players may position themselves in a facing arrangement at either side of an up standing transparent shared display 10. The tablets or other device would synch with the shared display for the play of a game as described herein.

In various embodiments the feature game may be as retained in suitable memory in the arrangement processor(s), e.g. EGM processor board 203 (FIG. 7B) or the game may be provided and controlled by a server to present the feature game such as described in, for example, Lockard, et al, U.S. patent application Ser. No. 13/919,587 filed Jun. 17, 2013 and titled "Apparatus, System and Method for Providing a Community Wagering Game at a Gaming Machine", the disclosure of which is incorporated by reference.

Although the description above contains many specificities, these should not be construed as limiting the scope of the invention but as merely providing an illustration of the presently preferred embodiment of the invention.

I claim:

1. An arrangement for two players to play a shared game comprising:

at least one gaming machine defining back-to-back gaming terminals each terminal including a primary game display;

at least one processor for controlling each gaming terminal when played by a player to display a primary game for play thereof;

a transparent shared video display disposed to be viewed by said players positioned at said back-to-back gaming terminals, said players able to view one another through the shared display;

said at least one processor configured to control said shared video display to, in a first condition where only one of said gaming terminals is played by a first player, display content directed to only said first player and in a second condition where both of said gaming terminals are played and in response to the detection of a triggering condition, display shared game content simultaneously viewable by both said first and second players and to receive inputs from said players to control said shared game to a conclusion thereof.

2. The arrangement of claim 1 comprising said gaming terminals are low profile terminals and said transparent shared video display is configured to up stand between said back-to-back gaming terminals.

3. The arrangement of claim 1 comprising said transparent shared video display includes a touch screen player interface.

4. The arrangement of claim 1 comprising said at least one controller is configured to control the shared video display to display said shared game content as opaque.

5. The arrangement of claim 1 comprising said at least one controller is configured to control the shared video display to display at least a portion of said shared game content as semi-opaque.

6. The arrangement of claim 1 comprising said at least one controller is configured to control the shared video display to display content other than shared game content.

7. In an arrangement including video terminals disposed in a back-to-back relationship and each configured to include a primary video display for a player to play a game, a method for providing shared content to the players comprising:

locating a transparent video feature display between said terminals for viewing by each player and through which each player may view the other player;

configuring a processor to detect (a) play of only one of said video terminals and in response thereto control said transparent video feature display for displaying first content and (b) simultaneous play of each of said video terminals and a trigger condition and in response thereto displaying at said feature display shared video content in the form of one or more of shared game content and non-game content said content displayed as one or more of opaque and semi-opaque content: and where shared game content is displayed at said shared transparent display during said simultaneous play is shared game content, providing for said players to provide input to said processor to interface with said shared game.

8. The method of claim 7 comprising providing said feature display with a touch input player interface.

9. The method of claim 7 comprising configuring said processor for determining only one player at said video terminals and in response thereto controlling said feature display to display said non-game content.

10. Apparatus for presenting a game for collaborative play between first and second players comprising:

first and second terminals arranged in a back-to-back relationship for play, respectively, by first and second players, each terminal including a primary game display to display a primary game and a player interface;

an upstanding transparent shared video display disposed to be viewed by said first and second players playing at said back-to-back gaming terminals, said players able to view one another through the shared display; and a processor configured to detect (a) play of only said first terminals and in response thereto control said transparent shared video display to display first content for the first player and (b) simultaneous play of each of said first and second terminals and (1) a trigger condition and in response to said trigger condition (i) control said transparent shared video display to display shared video content for a competitive game, process inputs by said first and second players at said interfaces to control said transparent shared video display to display images representing play until conclusion of said competitive game.

11. The apparatus of claim 10 comprising said processor configured to control said transparent shared video display to display shared video content for a competitive game selected from the group consisting of a Poker and a Backgammon game.

* * * * *